United States Patent
Shibayama

(10) Patent No.: US 10,527,101 B2
(45) Date of Patent: Jan. 7, 2020

(54) BEARING SEALING DEVICE

(71) Applicant: UCHIYAMA MANUFACTURING CORP., Okayama (JP)

(72) Inventor: Masanori Shibayama, Okayama (JP)

(73) Assignee: UCHIYAMA MANUFACTURING CORP., Okayama (JP)

( * ) Notice: Subject to any disclaimer, the term of this patent is extended or adjusted under 35 U.S.C. 154(b) by 0 days.

(21) Appl. No.: 15/453,490

(22) Filed: Mar. 8, 2017

(65) Prior Publication Data

US 2017/0284471 A1    Oct. 5, 2017

(30) Foreign Application Priority Data

Mar. 29, 2016 (JP) .................................. 2016-65050

(51) Int. Cl.
  *F16C 33/80* (2006.01)

(52) U.S. Cl.
  CPC ........ *F16C 33/805* (2013.01); *F16C 2326/02* (2013.01)

(58) Field of Classification Search
  CPC .. F16J 15/3264; F16J 15/3268; F16J 15/3256; F16J 15/16; F16J 15/4478; F16C 33/805; F16C 19/186; F16C 2326/02
  See application file for complete search history.

(56) References Cited

U.S. PATENT DOCUMENTS

| | | | | |
|---|---|---|---|---|
| 4,721,312 A | * | 1/1988 | Hornberger | F16J 15/3264 277/349 |
| 5,722,664 A | * | 3/1998 | Otto | F16C 33/7813 277/559 |
| 5,890,812 A | * | 4/1999 | Marcello | F16C 33/7813 384/148 |
| 5,895,052 A | * | 4/1999 | Drucktenhengst | F16J 15/3256 277/351 |
| 6,637,754 B1 | * | 10/2003 | Ohtsuki | F16C 19/186 277/549 |

(Continued)

FOREIGN PATENT DOCUMENTS

| | | | | |
|---|---|---|---|---|
| JP | 2006002840 A | * | 1/2006 | ......... F16C 33/7883 |
| JP | 2006-342827 A | | 12/2006 | |
| JP | 2010-91036 A | | 4/2010 | |

(Continued)

*Primary Examiner* — Eugene G Byrd
(74) *Attorney, Agent, or Firm* — Muncy, Geissler, Olds & Lowe, P.C.

(57) ABSTRACT

A bearing sealing device has relatively and coaxially rotating inner and outer members. A first member is fitted onto the inner member, and a second member includes a seal lip portion and a core member fitted into the outer member. The first member has an inner diametrical side cylindrical portion, circular plate portion, and outer diametrical side cylindrical portion. The core member has a cylindrical portion and circular plate portion. A first labyrinth portion is formed along the shaft direction in a gap between the outer diametrical side cylindrical portion and the core member cylindrical portion which face each other diametrically. A second labyrinth portion is formed such that an end face on the bearing space side in the outer diametrical side cylindrical portion faces the core member circular plate portion. A diametrical direction length of the end face is equal to or more than 0.6 mm.

16 Claims, 7 Drawing Sheets

(56) References Cited

U.S. PATENT DOCUMENTS

2004/0207160 A1* 10/2004 von Geisau ......... F16C 33/7886
   277/549
2009/0127796 A1* 5/2009 Kanzaki ............... F16J 15/3264
   277/562

FOREIGN PATENT DOCUMENTS

| JP | 2015-110958 A | | 6/2015 |
|----|---------------|---|--------|
| JP | 2016-080145 | * | 5/2016 |

* cited by examiner

BEARING SEALING DEVICE

TECHNICAL FIELD

The present invention relates to a bearing sealing device, for instance, used in a bearing device of a wheel supporting portion of a vehicle. More specifically, the present invention relates to a bearing sealing device which is mounted between an outer ring, i.e. an outer member, and an inner ring, i.e. an inner member.

BACKGROUND ART

An example of the above, disclosed in Patent Literatures 1 to 3, is the one constituted by combining a first member integrally attached to an inner member and a second member; the second member is integrally attached to an outer member and has a seal lip portion which elastically contacts the first member and is made of elastic material. Patent Literatures 1 to 3 below disclose the bearing sealing device in which the first member, i.e. a slinger, has a first cylindrical portion, a circular plate portion, and a second cylindrical portion. The first cylindrical portion is fitted to the inner member; the circular plate portion extends from an end portion of the first cylindrical portion on an opposite side to the second member into an outer diametrical side; and the second cylindrical portion extends from an outer diametrical side end portion of the circular plate portion along a shaft direction in the same direction as the first cylindrical portion. The second member of the bearing sealing device has a core member and the seal lip portion. The core member has a cylindrical portion which is fitted to the outer member, and a flange portion which extends from one end portion of the cylindrical portion into an inner diametrical side. The seal lip portion is fixed to the second member, elastically contacts the slinger, and is made of elastic material. Patent Literatures 1 to 3 below disclose the bearing sealing device in which a labyrinth portion is formed between opposite faces of the second cylindrical portion of the first member and the second member.

CITATION LIST

Patent Literature

Patent Literature 1: Japanese Unexamined Patent Application Publication No. 2006-342827
Patent Literature 2: Japanese Unexamined Patent Application Publication No. 2010-91036
Patent Literature 3: Japanese Unexamined Patent Application Publication No. 2015-110958

SUMMARY OF INVENTION

Technical Problem

In the bearing sealing device disclosed in Patent Literatures 1 to 3, a section of the slinger is formed in a reclined U shape of a double cylinder shape by the first cylindrical portion on the inner diametrical side, the circular plate portion, and the second cylindrical portion on the outer diametrical side. Therefore, intrusion of muddy water or the like including dust, hereinafter referred to as muddy water or the like, from outside through the labyrinth portion into the bearing sealing device is effectively prevented. The bearing sealing device disclosed in Patent Literature 1 is formed with a bulge portion (7g) at a closest position to the second cylindrical portion on the outer diametrical side. In the bearing sealing device disclosed in Patent Literature 2, labyrinth portions (37, 38) constituted between opposite faces of the second cylindrical portion of the first member and the second member are formed in a crank shape. The bearing sealing device disclosed in Patent Literature 3 is formed with an auxiliary lip (13d) at a closest position to the second cylindrical portion on the outer diametrical side. The bearing sealing devices disclosed in Patent Literatures 1 to 3 have such a structure that muddy water or the like hardly intrudes. However, once muddy water or the like intrudes into the bearing sealing device, it is anticipated that it is difficult to be discharged to the outside and is easily and gradually accumulated in a space portion surrounded by the slinger and the second member. It is difficult to achieve both preventing intrusion of muddy water or the like and improving discharge ability. When muddy water or the like is accumulated, a foreign object such as dust contained in muddy water or the like is jammed into an elastic contact portion of a side lip to the circular plate portion of the slinger, thereby an elastic sliding contact portion of the side lip to the circular plate portion is worn away in accordance with rotation of a rotation side member. Thus, muddy water or the like further intrudes from the elastic contact portion of the side lip to the circular plate portion through the bearing sealing device into a bearing space, i.e. a seal object. There occur problems in deteriorating seal function over time and in the life of the bearing sealing device.

The present invention is proposed in view of the above mentioned problems. An object of the present invention is to provide the bearing sealing device which prevents intrusion of muddy water or the like into the bearing sealing device, enhance discharge ability of intruding muddy water or the like, and prolong the life of the bearing sealing device.

Solution to Problem

A bearing sealing device of one embodiment of the present invention for sealing a bearing space constituted with an inner member and an outer member which rotate relatively and coaxially, is characterized in that the bearing sealing device is provided with a first member fitted onto the inner member, and a second member including a core member fitted into the outer member and a seal lip portion having a lip portion and being made of elastic material, the lip portion slidably contacts the first member, and the first member and the second member are combined. The first member has an inner diametrical side cylindrical portion, a circular plate portion which extends into an outer diametrical direction from an end portion, being opposite to the bearing space, of the inner diametrical side cylindrical portion, and an outer diametrical side cylindrical portion which extends from an outer circumferential side end portion of the circular plate portion along a shaft direction into the bearing space side. The core member of the second member has a core member cylindrical portion which is fitted into the outer member, and a core member circular plate portion which extends from an end portion on the bearing space side of the core member cylindrical portion into an inner diametrical direction. A first labyrinth portion is formed along the shaft direction in a gap between the outer diametrical side cylindrical portion of the first member and the core member cylindrical portion of the second member which are provided so as to face each other in a diametrical direction; a second labyrinth portion is formed in such a manner that an end face on the bearing space side in the outer diametrical side cylindrical portion of the first member is formed so as to face the core member circular plate portion of the second member; and a diametrical direction length of the end face is equal to or more than 0.6 mm.

In the bearing sealing device of the embodiment of the present invention, the first member has the inner diametrical side cylindrical portion and the outer diametrical side cylindrical portion. The outer diametrical side cylindrical portion of the first member forms the first labyrinth portion along the shaft direction and the second labyrinth portion which continues into the first labyrinth portion and is along the diametrical direction, between the second member and the outer diametrical side cylindrical portion of the first member. The diametrical direction length of the end face on the bearing space side in the outer diametrical side cylindrical portion of the first member is equal to or more than 0.6 mm. Therefore, a distance from a start position, hereinafter referred to as a start point Z (see FIG. 2), of the first labyrinth portion to a space portion (see the reference numeral 110 in FIG. 2) in which the lip portion is arranged increases and a substantial intrusion route of muddy water or the like from outside into the bearing sealing device becomes longer. In addition to the above, by a centrifugal action of the first member in accordance with an axial rotation of the inner member or the outer member, intrusion of muddy water or the like into the bearing sealing device is prevented. Even if muddy water or the like intrudes through the first labyrinth portion and the second labyrinth portion into the space portion in which the lip portion is arranged, intruding muddy water or the like is rapidly discharged through the first labyrinth portion and the second labyrinth portion to the outside of the bearing sealing device and its accumulation is suppressed. Thereby, jamming of dust or the like into a sliding contact portion between the lip portion and the first member decreases and the life of the bearing sealing device is prolonged. When the diametrical direction length of the end face on the bearing space side in the outer diametrical side cylindrical portion of the first member is less than 0.6 mm, discharging effect of muddy water or the like is likely to be reduced.

In another embodiment of the present invention, the diametrical direction length of the end face can be equal to or more than 1.0 mm. In the present invention, the distance from the start point Z of the first labyrinth portion to the space portion in which the lip portion is arranged further increases. Thereby, the intrusion route of muddy water or the like becomes longer as above. By the combination of the longer intrusion route of muddy water or the like and a centrifugal action of a slinger in accordance with the axial rotation of the inner ring, intrusion of muddy water or the like into the bearing sealing device is prevented and discharge function of muddy water or the like is more effectively exerted.

In another embodiment of the present invention, a diametrical direction length between an inner circumferential face of the outer diametrical side cylindrical portion and a distal end portion of the lip portion before being combined with the first member can be equal to or more than 1.4 mm, the distal end portion of the lip portion being arranged closest to the inner circumferential face.

In the present invention, a member which blocks discharge of muddy water or the like is not arranged in the vicinity of the inner circumferential face of the outer diametrical side cylindrical portion, and discharge function of muddy water or the like is more effectively exerted. The intrusion route of muddy water or the like becomes longer, the lip portion arranged closest to the inner circumferential face of the outer diametrical side cylindrical portion is unlikely to be attacked directly by muddy water or the like, and the life of the bearing sealing device is prolonged.

In another embodiment of the present invention, the end face of the outer diametrical side cylindrical portion has a covering portion which is covered with elastic material, and the covering portion can be provided with a plurality of concaves or convexes provided radially from a center of a shaft and apart from each other in a circumferential direction.

In the present invention, when muddy water or the like intrudes into the space portion in which the lip portion is arranged, a pumping action works in the space portion in accordance with the axial rotation of the inner member or the outer member, thereby pushing back muddy water or the like back to the first labyrinth portion side and the second labyrinth portion side. The pushed back muddy water or the like is effectively discharged to the outside of the bearing sealing device after flowing along a slit portion in a concave or convex shape and passing through the second labyrinth portion side and the first labyrinth portion side.

Advantageous Effects of Invention

In the bearing sealing device of an aspect of the present invention in which the first member has the inner diametrical side cylindrical portion and the outer diametrical side cylindrical portion, the outer diametrical side cylindrical portion of the first member forms the first labyrinth portion along the shaft direction and the second labyrinth portion which continues into the first labyrinth portion and is along the diametrical direction, between the second member and the outer diametrical side cylindrical portion of the first member. The diametrical direction length of the end face on the bearing space side in the outer diametrical side cylindrical portion of the first member is equal to or more than 0.6 mm. Therefore, the distance from the start point Z of the first labyrinth portion to the space portion in which the lip portion is arranged increases and the substantial intrusion route of muddy water or the like from outside into the bearing sealing device becomes longer. Thereby, intrusion of muddy water or the like into the bearing sealing device is effectively suppressed, discharge ability of intruding muddy water or the like is enhanced, and the life of the bearing sealing device is prolonged.

DESCRIPTION OF EMBODIMENTS

Figure 1:
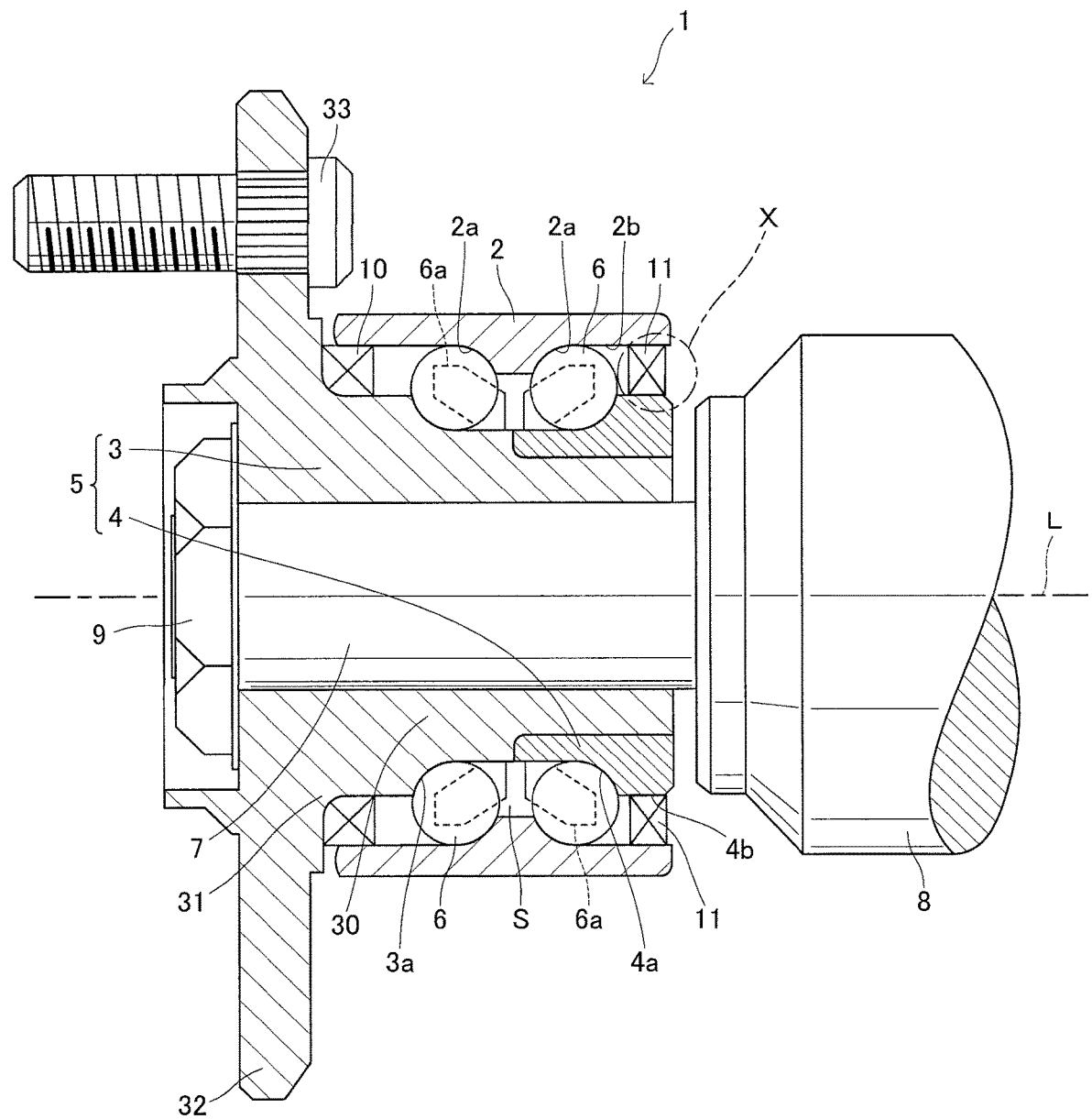
FIG. 1 is a longitudinal sectional view schematically showing one example of the bearing device to which the bearing sealing device of the present invention is applied.

An embodiment of the present invention is explained below based on the drawings. FIG. 1 shows a bearing device 1 which supports a wheel of a vehicle (not shown) in an axially rotatable manner. The bearing device 1 generally includes an outer ring 2, i.e. an outer member, a hub wheel 3, an inner ring member 4 which is integrally fitted to a vehicle body side of the hub wheel 3, and two rows of rolling elements 6 . . . (balls) which are interposed between the outer ring 2 and the hub wheel 3, and between the outer ring 2 and the inner ring member 4. In the aspect of the embodiment, the hub wheel 3 and the inner ring member 4 constitute the inner ring 5, i.e. an inner member. The outer ring 2 is fixed to a body of the vehicle (not shown). The hub wheel 3 is spline-fitted coaxially to a drive shaft 7, and the drive shaft 7 is connected to a drive source, i.e. a drive transmission portion (not shown), through a velocity joint 8. The drive shaft 7 is integrated with the hub wheel 3 by a nut 9, thereby preventing removal of the hub wheel 3 from the drive shaft 7. The inner ring 5 (the hub wheel 3 and the inner ring member 4) is rotatable around a shaft L to the outer ring 2, the outer ring 2 and the inner ring 5 constitute two members which relatively rotate, and an annular space S is formed between the two members. The two rows of rolling elements 6 . . . , which are retained by the retainer 6a, are provided for the annular space S in such a manner that a track wheel 2a of the outer ring 2, a track wheel 3a of the hub wheel 3, and a track wheel 4a of the inner ring member 4 are provided in a rotatable manner. The hub wheel 3 has a hub wheel body 30 in a cylindrical shape and a hub flange 32 which is formed so as to extend from the hub wheel body 30 through a rising base portion 31 into an outer diametrical side. The wheel is attached and fixed to the hub flange 32 by a bolt 33 and a nut (not shown). Hereinafter, a side towards the wheel along the shaft L direction (the left side of FIG. 1) is referred to as a wheel side, and a side towards the vehicle body (the right side of FIG. 1) is referred to as a vehicle body side.

The annular space S forms a bearing space; and in both end portions along the shaft L direction of the annular space S, hereinafter referred to as the bearing space, bearing seals 10, 11, i.e. the bearing sealing devices, are respectively mounted between the outer ring 2 and the hub wheel 3 and between the outer ring 2 and the inner ring member 4, thereby sealing the end portions along the shaft L direction of the bearing space S. Therefore, intrusion of muddy water or the like into the bearing space S or leaking of lubricant such as grease which is filled in the bearing space S is prevented.

Figure 2:
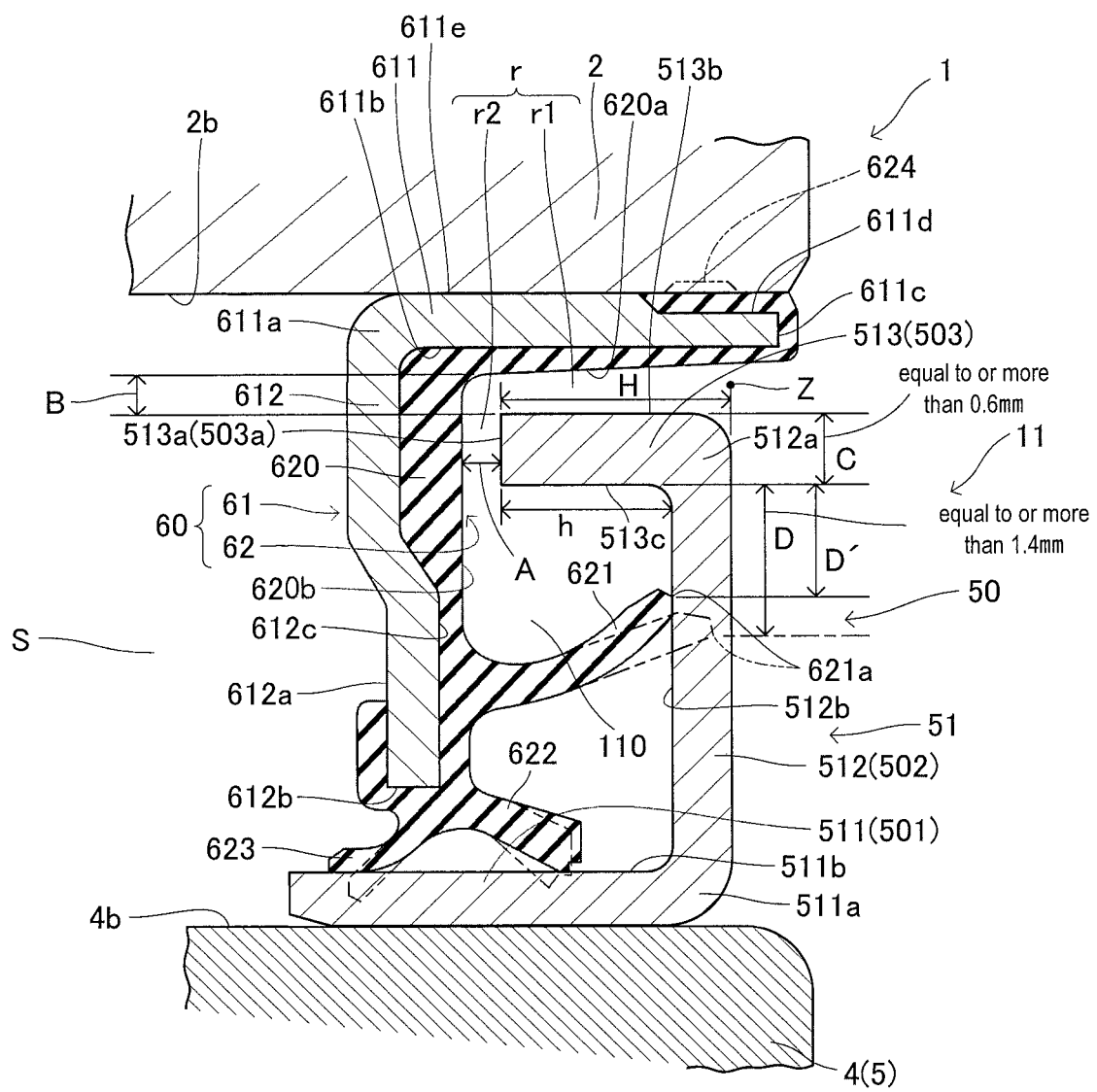
FIG. 2 is an enlarged view of a part X in FIG. 1 and shows a first embodiment of the bearing sealing device of the present invention.

Of the bearing seals 10, 11, the bearing seal 11 on the vehicle body side is deemed as the bearing sealing device of the present invention, and explained with reference to FIGS. 2 to 6. The present invention is also applied to the bearing seal 10 on the wheel side. FIG. 2 shows the first embodiment of the bearing sealing device of the present invention and the bearing seal 11 is mounted into the bearing device 1 which has the outer ring 2, i.e. the outer member, and the inner ring 5, i.e. the inner member. The bearing seal 11 is constituted by combining a first member 50 which is fitted onto the inner ring 5 and in a double cylinder shape, and a second member 60 which is fitted into the outer ring 2. In the bearing seal 11 of the embodiment, the first member 50 is constituted by a slinger 51, an inner diametrical side cylindrical portion 501 is constituted by a first cylindrical portion 511 of the slinger 51, and an outer diametrical side cylindrical portion 503 of the first member 50 is constituted by a second cylindrical portion 513.

In the bearing seal 11 of the embodiment, the second member 60 includes a core member 61 which is fitted into the outer ring 2, and a seal lip portion 62 which is fixed to the core member 61 and made of elastic material. More specifically, the core member 61 includes a core member cylindrical portion 611 which is fitted into an inner diametrical face 2b of the outer ring 2. The core member 61 further includes a core member circular plate portion 612 which extends from an end portion 611a on the bearing space S side in the core member cylindrical portion 611 into an inner diametrical side. A section of the core member 61 is formed substantially in an L shape. The seal lip portion 62, which is made of rubber material or the like, includes a seal lip base portion 620 which is integrally fixed to the core member 61 by vulcanization molding, and a plurality of lip portions, i.e. one piece of side lip 621 and two pieces of radial lips 622, 623, which extend from the seal lip base portion 620. In FIG. 2, two-dot chain lines of the side lip 621 and the radial lips 622, 623 show the original forms before elastic deformation. The seal lip base portion 620 is integrally fixed to the core member 61 so as to cover an inner circumferential edge portion 612b from a part of a face 612a of the core member circular plate portion 612 of the core member 61 on the bearing space S side and cover an entire face of a face 612c of the core member circular plate portion 612 opposite to the bearing space S. The seal lip base portion 620 is integrally fixed to the core member 61 so as to cover an entire face of an inner diametrical face 611b of the core member cylindrical portion 611, enter an end portion 611c on an opposite side to the bearing space S, and reach an outer diametrical face 611d of the core member cylindrical portion 611. A portion which reaches the outer diametrical face 611d of the core member cylindrical portion 611 of the seal lip base portion 620 is defined as an annular projection portion 624 which bulges on the outer diametrical side. When the core member 61 is fitted into the outer ring 2, the annular projection portion 624 is formed so as to interpose in a compressed state between the inner diametrical face 2b of the outer ring 2 and the outer diametrical face 611d of the core member cylindrical portion 611. Intrusion of muddy water or the like into a fitting portion 611e between the outer ring 2 and the core member cylindrical portion 611 is prevented, with the annular projection portion 624 being interposed in the compressed state between the outer ring 2 and the core member cylindrical portion 611. Thereby, generation of rust in the fitting portion 611e between the outer ring 2 and the core member cylindrical portion 611 is prevented, and intrusion of muddy water or the like from the fitting portion 611e into the bearing space S is also prevented. A two-dot chain line of the annular projection portion 624 shows the original form before compression.

The first member 50 includes the slinger 51 of a double cylinder shape, of which section is formed in a reclined U shape. The slinger 51 includes the first cylindrical portion 511, a circular plate portion 512, and the second cylindrical portion 513. The first cylindrical portion 511, i.e. the inner diametrical side cylindrical portion 501, is fitted onto an outer diametrical face 4b of the inner ring member 4, i.e. the inner ring 5. The circular plate portion 512, i.e. a circular plate portion 502 of the first member, extends to the outer diametrical side from an end portion 511a of the first cylindrical portion 511 on the opposite side to the bearing space S. The second cylindrical portion 513, i.e. the outer diametrical side cylindrical portion 503, extends to the bearing space S side from an outer circumferential edge portion 512a of the circular plate portion 512 along the shaft L direction. An end face 513a (503a) on the bearing space S side in the second cylindrical portion 513 of the first member 50 is configured to face the core member circular plate portion 612 of the second member 60. A diametrical direction length C of the end face 513a is set equal to or more than 0.6 mm, preferably equal to or more than 1.0 mm, which is to be mentioned below in detail.

A labyrinth structure portion "r" is formed between the second cylindrical portion 513 of the slinger 51 and the second member 60. The labyrinth structure portion "r" is constituted by a first labyrinth portion "r1" along the shaft L direction, and a second labyrinth portion "r2" which continues into the first labyrinth portion "r1" and is along the diametrical direction. The first labyrinth portion "r1" is formed between an outer circumferential face 513b of the second cylindrical portion 513 and a fitting portion of the second member 60 into the outer ring 2, the fitting portion facing the outer circumferential face 513b; the fitting portion refers to the core member cylindrical portion 611 and an inner circumferential face 620a of the seal lip base portion 620 covering the core member cylindrical portion 611. Even though a member such as a lip portion which blocks discharge of muddy water or the like is not arranged in a route of the first labyrinth portion "r1", the inner circumferential face 620a of the seal lip base portion 620 is formed slightly inclined in such a manner that a gap gradually becomes narrow from a start point Z along the shaft L direction into the bearing space S side, thereby being configured to easily discharge muddy water or the like if it intrudes. The second labyrinth portion "r2" is formed along the diametrical direction between the end face 513a of the second cylindrical portion 513 on the bearing space S side, i.e. the wheel side, and a vehicle body side face 620b of a portion which faces the end face 513a, i.e. a portion of the seal lip base portion 620 which covers the opposite side face 612c of the core member circular plate portion 612 to the bearing space S. The member such as the lip portion which blocks discharge of muddy water or the like is not arranged in a route of the second labyrinth portion "r2", either.

The side lip 621 of the second member 60 elastically contacts a face 512b of the circular plate portion 512 of the slinger 51 on the bearing space S side. Of the plural lip portions, the side lip 621 is arranged closest to an inner circumferential face 513c of the second cylindrical portion 513. Grease (not shown) is applied to the face 512b in which the side lip 621 slidably contacts the circular plate portion 512 of the slinger 51. The side lip 621 is formed so as to expand a diameter toward a distal end portion 621a. A diametrical direction length D between the distal end portion 621a of the side lip 621 before combining with the first member 50 and the inner circumferential face 513c is not specified in particular but is desired to be as long as possible, preferably equal to or more than 1.4 mm. As above, a distance from a start point Z of the first labyrinth portion "r1" to the side lip 621, i.e. an intrusion route of muddy water or the like, becomes longer. Thereby, the side lip 621 is unlikely to be attacked directly by muddy water or the like and its life is prolonged. The reference sign D' in the figure shows a diametrical direction length between the inner circumferential face 513c and the distal end portion 621a of the side lip 621 after actually combining the first member 50 and the second member 60. Although it would be ideal to specify the diametrical direction length shown as the reference sign D', in practice, to design in advance the dimension after combining the first member 50 and the second member 60 is difficult. Therefore, the diametrical direction length D between the distal end portion 621a of the side lip 621 before combining with the first member 50 and the inner circumferential face 513c is specified.

The radial lips 622, 623 fork into two branches from the seal lip base portion 620 and elastically contact an outer diametrical face 511b of the first cylindrical portion 511 of the slinger 51. The radial lip 622 gradually contracts a diameter toward a distal end and extends opposite to the bearing space S side, thereby preventing dust, muddy water, and the like which pass through the side lip 621 from further intruding into the bearing space S side. The radial lip 623 contracts a diameter toward a distal end and extends to the bearing space S side, thereby preventing leaking of grease filled in the bearing space S through the bearing seal 11. The number and the form of the seal lip portion 62 are not limited to those in the figure. Grease (not shown) is applied to sliding contact faces, i.e. the outer diametrical face 511b, between the radial lips 622, 623 and the first cylindrical portion 511 of the slinger 51.

In the bearing device 1 in which the bearing seal 11 is mounted as in the embodiment shown in FIG. 2, when the drive shaft 7 rotates around the shaft L, the inner ring 5 rotates relative to the outer ring 2 coaxially and integrally to the drive shaft 7. In such a case, the plural lip portions which are provided for the seal lip portion 62, relatively and slidably contact the circular plate portion 512 and the first cylindrical portion 511 of the slinger 51 respectively in an elastic state. Therefore, during the operation of the bearing device 1, intrusion of muddy water or the like from outside through the bearing seal 11 into the bearing space S is prevented. Leaking of lubricant such as grease which is filled in the bearing space S to the outside of the bearing device 1 is also prevented. In addition to the first labyrinth portion "r1" along the shaft L direction and the second labyrinth portion "r2" along the diametrical direction, the diametrical direction length C of the end face 513a is set equal to or more than 0.6 mm as in the embodiment. This structure increases a distance from a start position, namely the start point Z, of the first labyrinth portion "r1" to a space in which the lip portions (621, 622, 623) are arranged and makes longer a substantial intrusion route of muddy water or the like from outside of a seal space by the bearing seal 11. By the combination of the longer intrusion route of muddy water or the like in which the diametrical direction length C of the end face 513a is set equal to or more than 0.6 mm and a centrifugal action in accordance with an axial rotation of the inner ring 5, intrusion of muddy water or the like including dust from outside of the bearing seal 11 into the bearing seal 11 is suppressed.

Since the first labyrinth portion "r1" and the second labyrinth portion "r2" are gaps, intrusion of muddy water or the like is not prevented completely and some muddy water or the like unavoidably intrudes into the bearing seal 11. Muddy water or the like which intrudes into the bearing seal 11 reaches a space portion 110 formed by the second cylindrical portion 513 of the slinger 51, the circular plate portion 512, the side lip 621 or the radial lip 622, and the seal lip base portion 620. However, as mentioned above, the longer the diametrical direction length C of the end face 513a becomes, i.e. equal to or more than 0.6 mm, the more intrusion of muddy water or the like is retarded. Thereby, muddy water or the like is discharged by the axial rotation of the inner ring 5 before being accumulated in the space portion 110. Even if muddy water or the like intrudes into the space portion 110 through the first labyrinth portion "r1" and the second labyrinth portion "r2", the time for muddy water or the like to reach the distal end portion 621a of the side lip 621 is retarded when the diametrical direction length D is set equal to or more than 1.4 mm. During the above-mentioned time, muddy water or the like is discharged through the second labyrinth portion "r2" and the first labyrinth portion "r1" by the centrifugal action in accordance with the rotation of the inner ring 5, thereby as a result reducing muddy water or the like which attacks the distal end portion 621a. Furthermore, since the lip portion or the like is not arranged in the vicinity of the inner circumferential face 513c of the second cylindrical portion 513, discharge of muddy water or the like is not blocked; intruding muddy water or the like is rapidly discharged through the second labyrinth portion "r2" and the first labyrinth portion "r1" to the outside of the bearing seal 11, and its accumulation is suppressed. Thereby, jamming of dust or the like into a sliding contact portion between the lip portions (621, 622, 623) and the first member 50 decreases and the life of the bearing seal 11 is prolonged.

Numerical values shown in FIG. 2 and mentioned below are not specified but are desirable for exerting the above-mentioned effects more effectively based on a test result mentioned below. A shaft L direction length H of the first labyrinth portion "r1" is desirable to be set equal to or more than 1.5 mm within a specification range of the bearing seal 11 or a space range of a portion in which the bearing seal 11 is mounted. A shaft direction length "h" of an inner diametrical side portion of the second cylindrical portion 513 of the first member 50 is desirable to be set equal to or more than 0.75 mm within the specification range of the bearing seal 11 or the space range of the portion in which the bearing seal 11 is mounted. Furthermore, a gap B of the first labyrinth portion "r1" and a gap A of the second labyrinth portion "r2" are not specified in particular but are desirable to be set equal to or less than 1 mm within the specification range, including processing tolerance, of the bearing seal 11 or the space range of the portion in which the bearing seal 11 is mounted. Specifically, gaps A and B are desirable to be as small as possible; the first member 50 rotates coaxially to the second member 60, thereby ensuring minimal gaps including processing tolerance such that the outer circumferential face 513b and the end face 513a of the second cylindrical portion 513 do not touch the inner circumferential face 620a and the vehicle body side face 620b of the seal lip base portion 620 during rotation.

Figure 3:
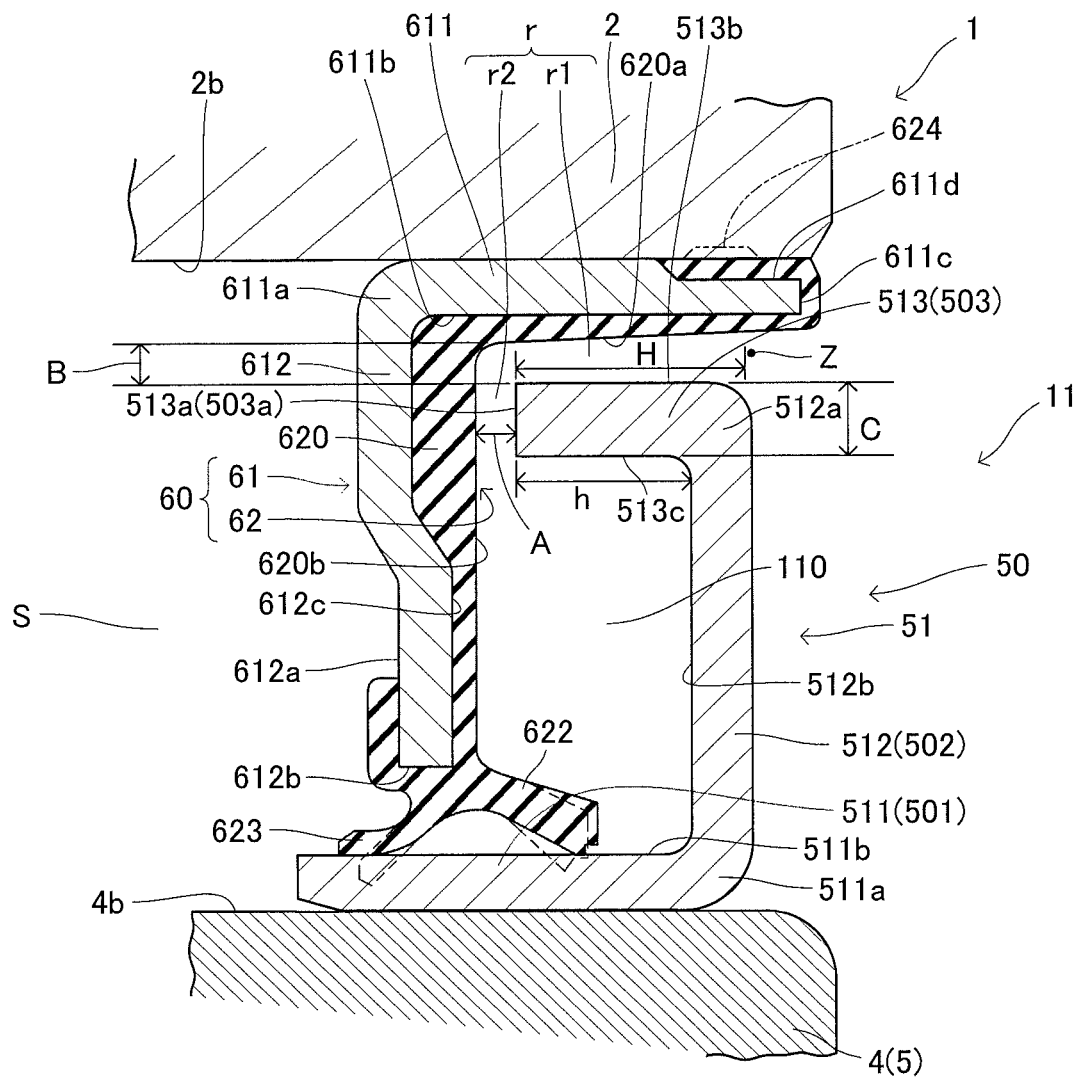
FIG. 3 is similar to FIG. 2 and shows a modified example of the bearing sealing device of the embodiment.

FIG. 3 shows a modified example of the embodiment. The example differs in that the side lip 621 as shown in the embodiment of FIG. 2 is not provided and the seal lip portion 62 is constituted by the radial lips 622, 623 which elastically contact the outer diametrical face 511b of the first cylindrical portion 511 of the slinger 51. Other structures are the same as the embodiment shown in FIG. 2 and common portions are allotted with the same reference numerals. In the embodiment, the diametrical direction length C of the end face 513a is set equal to or more than 0.6 mm, thereby increasing the distance from the start point Z to the space portion 110 in which the lip portions are arranged. Therefore, in the embodiment shown in FIG. 3, intrusion of muddy water or the like into the bearing seal 11 is prevented without the side lip 621 which is arranged on an outermost diametrical side in the above embodiment. In the embodiment, the space portion 110 in which the lip portion is not arranged in the vicinity of the inner circumferential face 513c of the second cylindrical portion 513 is largely ensured; and discharge of muddy water or the like is not blocked. Therefore, intruding muddy water or the like is rapidly discharged through the second labyrinth portion "r2" and the first labyrinth portion "r1" to the outside of the bearing seal 11 and its accumulation is suppressed. Furthermore, the number of the lip portions is reduced and rotation torque decreases. The member such as the lip portion which blocks discharge of muddy water or the like is not arranged in the routes of the first labyrinth portion "r1" and the second labyrinth portion "r2".

Figure 4:
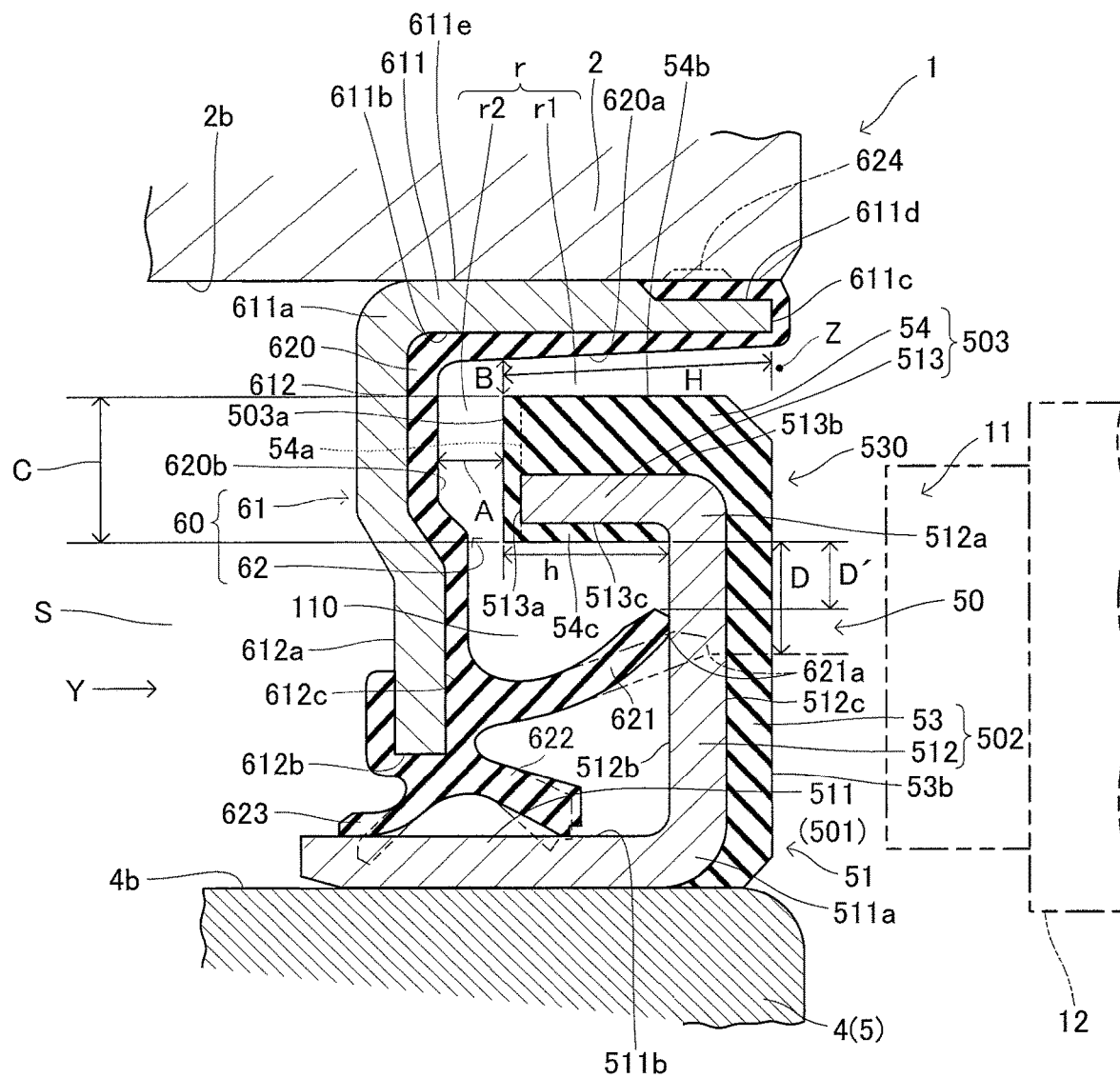
FIG. 4 is similar to FIG. 2 and shows a second embodiment of the bearing sealing device of the present invention.

FIG. 4 shows a second embodiment of the bearing sealing device of the present invention. In the bearing seal 11 of the embodiment, the form of the slinger 51 itself is similar to the forms as in the above-mentioned embodiment. However, the bearing seal 11 of the embodiment differs from that of the above-mentioned embodiment in that the first member 50 is constituted by the slinger 51 and an annular encoder 530 for detecting rotation. The annular encoder 530 has an encoder body 53 and a covering portion 54, the encoder body 53 covers a vehicle body side face 512c of the circular plate portion 512 of the slinger 51, and the covering portion 54 is formed so as to cover the second cylindrical portion 513 of the slinger 51. The bearing seal 11 of the embodiment also differs from that of the above-mentioned embodiment in that the circular plate portion 502 is constituted by the circular plate portion 512 of the slinger 51 and the encoder body 53 which covers the vehicle body side face 512c of the circular plate portion 512. The bearing seal 11 of the embodiment further differs from that of the above-mentioned embodiment in that the outer diametrical side cylindrical portion 503 is constituted by the covering portion 54 and the second cylindrical portion 513 of the slinger 51 which is covered with the covering portion 54. Namely, in the bearing seal 11 of the embodiment, i.e. the second embodiment, the first member 50 is constituted by the slinger 51 and the annular encoder 530; the inner diametrical side cylindrical portion 501 is constituted by the first cylindrical portion 511 of the slinger 51; the circular plate portion 502 is constituted by the circular plate portion 512 of the slinger 51 and the encoder body 53 which covers the vehicle body side face 512c of the circular plate portion 512; and the outer diametrical side cylindrical portion 503 is constituted by the covering portion 54 and the second cylindrical portion 513 of the slinger 51 which is covered with the covering portion 54. Furthermore, the bearing seal 11 of the embodiment differs from that of the above-mentioned embodiment in that the end face 503a of the outer diametrical side cylindrical portion 503 is covered with the covering portion 54, and in that the covering portion 54 is provided with a plurality of concaves 54a, 54a . . . in the form of a groove radially from a center of the shaft and apart from each other in the circumferential direction.

Hereinafter, common portions with the first embodiment are allotted with the same reference numerals and the explanation for common effects is omitted. Although an example in which the concave 54a is arranged is shown in the embodiment, the embodiment is not limited to such an aspect and similar effect is obtained in the embodiment in which the covering portion 54 is provided with a plurality of convexes instead.

The bearing seal 11 has the annular encoder 530 for detecting rotation. The annular encoder 530 has the encoder body 53 and the covering portion 54, the encoder body 53 is arranged so as to be integrally fixed to the vehicle body side face 512c of the circular plate portion 512 of the slinger 51, and the covering portion 54 is formed so as to cover the second cylindrical portion 513. The annular encoder 530 is integrally molded to the slinger 51 in such a manner that rubber material including magnetic powder is vulcanization-molded to the vehicle body side face 512c of the circular plate portion 512, the outer circumferential face 513b of the second cylindrical portion 513, the end face 513a on the bearing space S side, i.e. the wheel side, and the inner circumferential face 513c. A vehicle body side face 53b of the encoder body 53 is a magnetized face in which multiple north poles and south poles are alternately magnetized at equal intervals in the circumferential direction. A magnetic sensor 12 is installed in a vehicle body (not shown) so as to face the vehicle body side face 53b, i.e. a magnetized face, of the encoder body 53. A rotation detecting structure of the inner ring 5, i.e. the wheel, is constituted by the magnetic sensor 12 and the encoder body 53. The annular encoder 530 has the covering portion 54 which extends so as to cover the outer circumferential face 513b of the second cylindrical portion 513, the end face 513a on the bearing space S side, i.e. the wheel side, and the inner circumferential face 513c. In the figure, the covering portion 54 of which portion covering the outer circumferential face 513b is formed thicker than a portion covering the inner circumferential face 513c is shown but is not limited to the one as above. The portions can be formed substantially in the same thickness; to the contrary, the portion covering the inner circumferential face 513c can be formed thicker than the portion in the outer circumferential face 513b side; or the inner circumferential face 513c does not have to be covered. The covering portion 54 is also made of rubber material including magnetic powder; but unlike the encoder body 53, the covering portion 54 is not magnetized.

The covering portion 54 is arranged so as to cover the outer circumferential face 513b of the second cylindrical portion 513 of the slinger 51, the end face 513a on the bearing space S side in the second cylindrical portion 513, and the inner circumferential face 513c of the second cylindrical portion 513. The face on the bearing space S side in the covering portion 54 corresponds to the end face 503a of the outer diametrical side cylindrical portion 503. The diametrical direction length C of the end face 503a is set equal to or more than 0.6 mm. The diametrical direction length C of the end face 503a in the embodiment is set equal to or more than 0.6 mm, preferably equal to or more than 1.0 mm, which is common with the first embodiment.

The second member 60 includes the core member 61 which is substantially in the same form as the first embodiment, and the seal lip portion 62 which is fixed to the core member 61 and made of rubber. The seal lip portion 62, which is made of rubber material the same as above, includes the seal lip base portion 620 which is integrally fixed to the core member 61 by vulcanization molding, the side lip 621 and the radial lips 622, 623, which extend from the seal lip base portion 620. Also in the embodiment, the labyrinth structure portion "r" is formed between the outer diametrical cylindrical portion 503 and the second member 60. The labyrinth structure portion "r" is constituted by the first labyrinth portion "r1" along the shaft L direction, and the second labyrinth portion "r2" which continues into the first labyrinth portion "r1" and is along the diametrical direction. The first labyrinth portion "r1" is formed between an outer circumferential face 54b of the covering portion 54 and a fitting portion of the second member 60 into the outer ring 2, the fitting portion facing the outer circumferential face 54b; the fitting portion refers to the core member cylindrical portion 611 and the inner circumferential face 620a of the seal lip base portion 620 covering the core member cylindrical portion 611. Even though the member such as the lip portion which blocks discharge of muddy water or the like in the route of the first labyrinth portion "r1" is not arranged, the inner circumferential face 620a of the seal lip base portion 620 is formed slightly inclined in such a manner that the gap gradually becomes narrower from the start point Z along the shaft L direction into the bearing space S side, thereby being configured to easily discharge muddy water or the like if it intrudes. The second labyrinth portion "r2" is formed along the diametrical direction between the end face 503a of the outer diametrical side cylindrical portion 503, constituted with the covering portion 54, on the bearing space S side (the wheel side), and the vehicle body side face 620b of the portion which faces the end face 503a, i.e. the portion of the seal lip base portion 620 which covers the opposite side face 612c of the core member circular plate portion 612 to the bearing space S. The member such as the lip portion which blocks discharge of muddy water or the like is not arranged in the route of the second labyrinth portion "r2", either.

Figure 5:
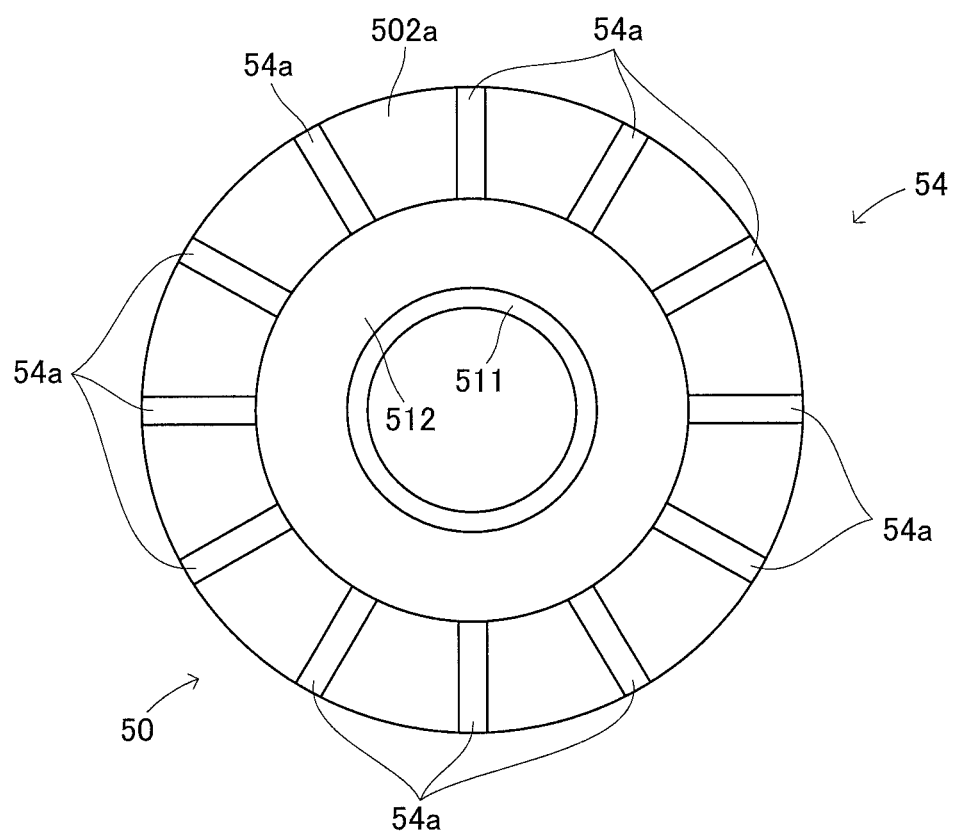
FIG. 5, showing the first member only, explains the coating portion which is provided at the bearing sealing device and is a view shown along a direction of an arrow Y in FIG. 4.

The face on the bearing space S side in the covering portion 54, i.e. the end face 503a of the outer diametrical side cylindrical portion 503 of the first member 50, can be provided with the plurality of concaves 54a, 54a . . . radially from the center of the shaft and apart from each other in the circumferential direction as shown in FIG. 5. In the above-mentioned case, when muddy water or the like intrudes into the space portion 110 in which the side lip 621 is arranged, a pumping action works in the space portion 110 in accordance with the axial rotation of the inner ring 5, thereby pushing muddy water or the like back to the first labyrinth portion "r1" side and the second labyrinth portion "r2" side. The pushed back muddy water or the like is effectively discharged to the outside of the bearing seal 11 after flowing along the concaves 54a, 54a . . . and passing through the second labyrinth portion "r2" and the first labyrinth portion "r1".

If the covering portion 54 is provided, the slinger 51 of which plate thickness is the same as the conventional one is able to be used and it is easy to ensure the length of the diametrical direction length C of the end face 503a of the outer diametrical side cylindrical portion 503. If the covering portion 54 is made of elastic material such as rubber material as above, processing of the concave 54a as above is easily executed.

Convexes can be used instead of the concaves 54a, 54a . . . shown in the embodiment; in such a case, the end face 503a shown in FIG. 5 becomes a recess, muddy water or the like flows along the recess and is discharged.

In common with the first embodiment, in the second embodiment, the side lip 621 of the second member 60 elastically contacts the face 512b of the circular plate portion 512 of the slinger 51 on the bearing space S side, and the diametrical direction length D between the distal end portion 621a of the side lip 621 before combining with the first member 50 and an inner circumferential face 54c is not specified in particular but is desired to be as long as possible, preferably equal to or more than 1.4 mm.

Also in the second embodiment, the shaft direction length H of the first labyrinth portion "r1" is not specified in particular but can be set equal to or more than 1.5 mm within the specification range of the bearing seal 11 or the space range of the portion in which the bearing seal 11 is mounted, which is the same as above. The shaft direction length "h" of the inner diametrical side portion of the outer diametrical side cylindrical portion 503 is set equal to or more than 0.75 mm within the specification range of the bearing seal 11 or the space range of the portion in which the bearing seal 11 is mounted, which is also the same as above. Furthermore, the gap B of the first labyrinth portion "r1" and the gap A of the second labyrinth portion "r2" can be set equal to or less than 1 mm within the specification range, including processing tolerance, of the bearing seal 11 or the space range of the portion in which the bearing seal 11 is mounted as above.

Also in the embodiment, in addition to the first labyrinth portion "r1" and the second labyrinth portion "r2" as above, the diametrical direction length C of the end face 503a is set equal to or more than 0.6 mm when the bearing seal 11 is mounted in the bearing device 1 shown in FIG. 1 and the inner ring 5 rotates around the shaft L. This structure increases the distance from the start position, namely the start point Z, of the first labyrinth portion "r1" to the space in which the lip portions (621, 622, 623) are arranged and makes longer the substantial intrusion route of muddy water or the like from outside of the seal space by the bearing seal 11. By the combination of the longer intrusion route of muddy water or the like in which the diametrical direction length C of the end face 503a is set equal to or more than 0.6 mm and the centrifugal action in accordance with the axial rotation of the inner ring 5, intrusion of muddy water or the like including dust from outside of the bearing seal 11 into the bearing seal 11 is suppressed, discharge function of muddy water or the like which intrudes into the space portion 110 is effectively exerted, and the life of the bearing seal 11 is prolonged.

Other structures are the same as the above-mentioned embodiment, common portions are allotted with the same reference numerals, and the explanation for the effects is omitted.

Figure 6:
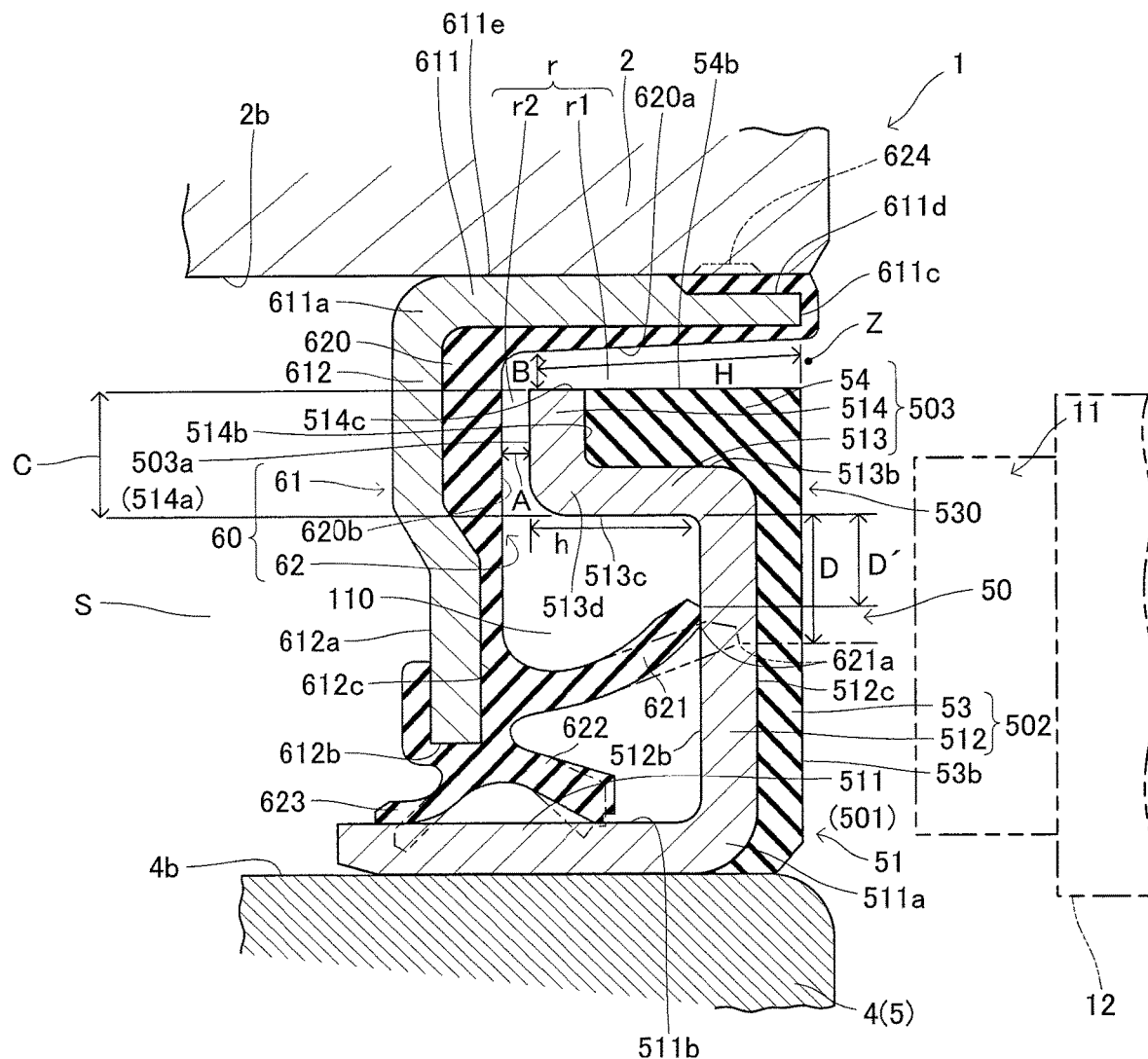
FIG. 6 is similar to FIG. 2 and shows a third embodiment of the bearing sealing device of the present invention.

FIG. 6 shows a third embodiment. The bearing seal 11 of the embodiment has the slinger 51 of which form is different from the above-mentioned embodiment and the slinger 51 has a bent portion 514 formed so as to bend into the outer diametrical direction from an end portion 513d on the bearing space S side in the outer diametrical side cylindrical portion 503. Therefore, in the bearing seal 11 of the embodiment, i.e. the third embodiment, the first member 50 is constituted by the slinger 51 and the annular encoder 530; the inner diametrical side cylindrical portion 501 is constituted by the first cylindrical portion 511 of the slinger 51; the circular plate portion 502 is constituted by the circular plate portion 512 of the slinger 51 and the encoder body 53 which covers the vehicle body side face 512c of the circular plate portion 512; and the outer diametrical side cylindrical portion 503 is constituted by the covering portion 54, the second cylindrical portion 513 of the slinger 51 which is covered with the covering portion 54, and the bent portion 514. In the embodiment, the end face 503a of the outer diametrical side cylindrical portion 503 of the first member 50 corresponds to a face 514a on the bearing space S side in the bent portion 514 of the slinger 51, and the diametrical direction length C of the end face 503a (514a) is set equal or more than 0.6 mm. Hereinafter, common portions with the first and second embodiments are allotted with the same reference numerals, and the explanation for common effects is omitted. The embodiment is the same as the second embodiment in that the first member 50 is constituted by the slinger 51 and the annular encoder 530 for detecting rotation and in that the circular plate portion 502 is constituted by the circular plate portion 512 of the slinger 51 and the encoder body 53 which covers the vehicle body side face 512c of the circular plate portion 512.

The covering portion 54 is arranged so as to cover the outer circumferential face 513b of the second cylindrical portion 513 of the slinger 51, and a face 514b of the bent portion 514 opposite to the bearing space S side. The face 514a on the bearing space S side in the covering portion 54 corresponds to the end face 503a of the outer diametrical side cylindrical portion 503. The diametrical direction length C of the end face 503a of the embodiment is set equal to or more than 0.6 mm, preferably equal to or more than 1.0 mm, which is the same as the first and second embodiments. Although processing for the slinger 51 is required, the slinger 51 of which plate thickness is the same as the conventional one is able to be used in the same manner as the second embodiment, thereby it is easy to ensure the length of the diametrical direction length C of the end face 503a of the outer diametrical side cylindrical portion 503.

The second member 60 includes the core member 61 which is substantially in the same form as the one shown in the first embodiment, and the seal lip portion 62 which is fixed to the core member 61 and made of rubber. The seal lip portion 62 is made of rubber as mentioned above and includes the seal lip base portion 620 which is integrally fixed to the core member 61 by vulcanization molding, the side lip 621 and the radial lips 622, 623 which extend from the seal lip base portion 620. Also in the embodiment, the labyrinth structure portion "r" is formed between the outer diametrical side cylindrical portion 503 and the second member 60. The labyrinth structure portion "r" is constituted by the first labyrinth portion "r1" along the shaft L direction, and the second labyrinth portion "r2" which continues into the first labyrinth portion "r1" along the diametrical direction. The first labyrinth portion "r1" is formed between the outer circumferential face 54b of the covering portion 54 (an end face 514c of the bent portion 514) and the fitting portion of the second member 60 into the outer ring 2; the fitting portion faces the outer circumferential face 54b of the covering portion 54 and the end face 514c of the bent portion 514; the fitting portion refers to the core member cylindrical portion 611, and the inner circumferential face 620a of the seal lip base portion 620 covering the core member cylindrical portion 611. Even though the member such as the lip portion which blocks discharge of muddy water or the like in the route of the first labyrinth portion "r1" is not arranged, the inner circumferential face 620a of the seal lip base portion 620 is formed slightly inclined in such a manner that the gap gradually becomes narrower from the start point Z along the shaft L direction into the bearing space S side, thereby being configured to easily discharge muddy water or the like if it intrudes. The second labyrinth portion "r2" is formed along the diametrical direction between the end face 503a on the bearing space S side in the outer diametrical side cylindrical portion 503 constituted by the bent portion 514, and the vehicle body side face 620b of the portion facing the end face 503a. The facing portion of the seal lip base portion 620 covers the opposite side face 612c of the core member circular plate portion 612 to the bearing space S side. The member such as the lip portion which blocks discharge of muddy water or the like is not arranged in the route of the second labyrinth portion "r2", either.

In common with the first and the second embodiments, in the third embodiment, the side lip 621 of the second member 60 elastically contacts the face 512b of the circular plate portion 512 of the slinger 51 on the bearing space S side, and the diametrical direction length D between the distal end portion 621a of the side lip 621 before combining with the first member 50 and the inner circumferential face 513c is not specified in particular but is desired to be as long as possible, preferably equal to or more than 1.4 mm.

Also in the embodiment, the shaft direction length H of the first labyrinth portion "r1" is not specified in particular but can be set equal to or more than 1.5 mm within the specification range of the bearing seal 11 or the space range of the portion in which the bearing seal 11 is mounted. The shaft direction length "h" of the inner diametrical side portion of the outer diametrical side cylindrical portion 503 is set equal to or more than 0.75 mm within the specification range of the bearing seal 11 or the space range of the portion in which the bearing seal 11 is mounted the same as above. Furthermore, the gap B of the first labyrinth portion "r1" and the gap A of the second labyrinth portion "r2" can also be set equal to or less than 1 mm within the specification range, including processing tolerance, of the bearing seal 11 or the space range of the portion in which the bearing seal 11 is mounted as above.

Also in the embodiment, in addition to the first labyrinth portion "r1" and the second labyrinth portion "r2" as above, the diametrical direction length C of the end face 503a is set equal to or more than 0.6 mm when the bearing seal 11 is mounted in the bearing device 1 shown in FIG. 1 and the inner ring 5 rotates around the shaft L. This structure increases the distance from the start position, namely the start point Z, of the first labyrinth portion "r1" to the space portion 110 in which the lip portions (621, 622, 623) are arranged and makes longer the substantial intrusion route of muddy water or the like from outside of the seal space by the bearing seal 11. By the combination of the longer intrusion route of muddy water or the like in which the diametrical direction length C of the end face 503a is set equal to or more than 0.6 mm and the centrifugal action in accordance with the axial rotation of the inner ring 5, intrusion of muddy water or the like including dust from outside of the bearing seal 11 into the bearing seal 11 is suppressed, discharge function of muddy water or the like which intrudes into the space portion 110 is effectively exerted, and the life of the bearing seal 11 is prolonged.

Other structures are the same as the above-mentioned embodiment, common portions are allotted with the same reference numerals, and the explanation for the effects is omitted. In the second embodiment shown in FIG. 4 and the third embodiment shown in FIG. 6, the slinger 51 is provided with the annular encoder 530 but not limited to the annular encoder; it can be provided with an annular member which is constituted with the elastic body such as rubber material.

The method and the results of a performance test of the bearing sealing device of the present invention are explained below referring to FIG. 7. The performance test evaluates changes of the diametrical direction length of the end face on the bearing space side in the outer diametrical side cylindrical portion of the first member and the intrusion amount of liquid.

<Method of Performance Test>

The performance test here is carried out in the method below. First of all, bearing seals with different diametrical lengths C of the end face 513a (503a) are mounted between the inner ring and the outer ring which simulate the bearing. And then, the simulated bearing as mentioned above is put in a container with liquid which simulates muddy water or the like and a lower half portion from the shaft L (refer to FIG. 1) of the bearing is dipped in the liquid. In such a state, the inner ring is rotated at 1100 rpm around the shaft L, the portion on the bearing space S side (refer to FIG. 1) in each bearing seal after predetermined time is observed, and a liquid intruding route (mm) from the above-mentioned portion is measured. In FIG. 7, Samples 1 to 4 correspond to the type of the bearing seal shown in FIG. 3; and Sample 5 corresponds to the type of the bearing seal including a slit portion 54a shown in FIG. 4. In the respective Samples, the shaft direction length H of the first labyrinth portion "r1" is set to 3.5 mm; the gap B of the first labyrinth portion "r1" is set to 0.5 mm; the shaft direction length "h" of the inner diametrical side portion of the outer diametrical side cylindrical portion 513 (503) of the first member 50 is set to 2.15 mm; and the gap A of the second labyrinth portion "r2" is set to 0.4 mm. The diametrical direction length C of the end face 513a (503a) is set to 0.5 mm in Sample 1 and 0.9 mm in Sample 2; it is also set to 2 mm in Samples 3 and 5, and 3 mm in Sample 4.

<Observation on Test Result>

Figure 7:
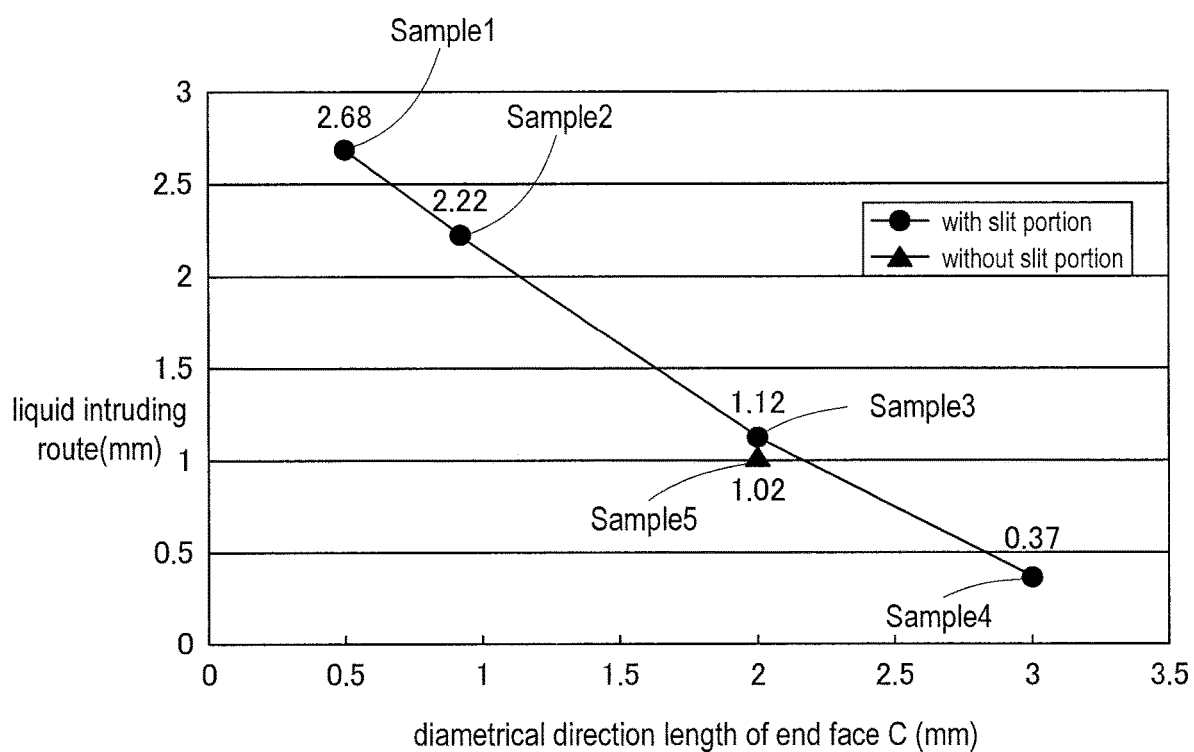
FIG. 7 is a chart in which a test result is graphed out.

In FIG. 7, when the diametrical direction length C of the end face 513a (503a) becomes longer, it is understood that the value of the liquid intruding route becomes smaller.

More specifically, when the liquid intruding route is equal to or less than 2.5 mm, it is considered that liquid is fully discharged from the space portion 110. From the test results, it is also understood that a value, i.e. the diametrical direction length C of the end face 513a (503a), between Samples 1 and 2 is desirable to be set equal to or more than 0.6 mm. When the diametrical direction length C of the end face 513a (503a) is set equal to or more than 1.0 mm, the liquid intruding route is considered to be approximately 2 mm based on FIG. 7, which is a more desirable value for the diametrical direction length C of the end face 513a (503a). When the diametrical length C of the end face 513a is set to 2.0 mm as in Sample 3, even if the slit portion 54a is not provided, the liquid intruding route decreases to 1.12 mm. When the slit portion 54a is provided as in Sample 5, the liquid intruding route decreases to 1.02 mm and liquid discharging effect is further enhanced. When the diametrical direction length C of the end face 513a is set to 3.0 mm as in Sample 4, the liquid intruding route becomes 0.37 mm.

From the test results of the respective Samples, the shape of the slinger 51 of the double cylinder shape, of which section is formed in the reclined U shape and which constitutes the first member 50 and the structure of lip portions (621, 622, 623) are not required to be complicated. If the diametrical direction length C of the end face 513a (503a) is set equal to or more than 0.6 mm, preferably equal to or more than 1.0 mm, the intrusion route of muddy water or the like becomes longer. Thereby, intrusion of muddy water or the like is prevented and discharge ability is also improved.

In the above-mentioned embodiment, an example shows that the bearing sealing device of the present invention is applied to the bearing device for the vehicle. However, the present invention is not limited to such an aspect; if the bearing sealing device is mounted between the two members in which the inner member is supported in the axially rotatable manner relative to the outer member, the bearing sealing device is suitably applied to the bearing device in the field of other industries. Even if the bearing device is for the vehicle, the bearing device is not limited to the one as shown in FIG. 1 and can be in other forms. The forms of the core member and the seal lip portion which is fixed to the core member are not limited to those in figures; and also fitting forms or the like between the core member and the outer ring are not limited to those in figures. Furthermore, the forms of the side lip and the radial lips can be appropriately modified according to the required specifications or the like.

REFERENCE SIGNS LIST 2 outer ring (outer member)
5 inner ring (inner member)
11 bearing seal (bearing sealing device)
50 first member
501 inner diametrical side cylindrical portion
503 outer diametrical side cylindrical portion
503a, 513a end face
51 slinger
511 first cylindrical portion
511a end portion
502, 512 circular plate portion 512a end portion
513 second cylindrical portion
530 annular encoder
54 covering portion
60 second member
61 core member
611 core member cylindrical portion
611a end portion
612 circular plate portion
62 seal lip portion
621, 622, 623 lip portion
r1 first labyrinth portion
r2 second labyrinth portion
L shaft
S bearing space
C diametrical direction length of end face on bearing space side of outer diametrical side cylindrical portion

The invention claimed is:

1. A bearing sealing device for sealing a bearing space constituted with an inner member and an outer member which rotate relatively and coaxially, the bearing sealing device comprising:
    a first member fitted onto the inner member that rotates around a shaft relative to the outer member, and
    a second member including a core member fitted into the outer member and a seal lip portion having a lip portion and being made of elastic material, the lip portion slidably contacting the first member,
    the first member and the second member being combined so as to face each other,
    the first member having an inner diametrical side cylindrical portion; a circular plate portion which extends into an outer diametrical direction from an end portion, being opposite to the bearing space, of the inner diametrical side cylindrical portion; and an outer diametrical side cylindrical portion which extends from an outer circumferential side end portion of the circular plate portion along a shaft direction into the bearing space side,
    the core member of the second member having a core member cylindrical portion which is fitted into the outer member; and a core member circular plate portion which extends from an end portion on the bearing space side of the core member cylindrical portion into an inner diametrical direction,
    wherein an inner circumferential side of the core member cylindrical portion and the core member circular plate portion is covered with a seal lip base portion of the seal lip portion,
    wherein a first labyrinth portion that continues into outside is formed along the shaft direction in a gap between an inner circumferential face of the seal lip base portion and the outer diametrical side cylindrical portion, the seal lip base portion covering the core member cylindrical portion, the inner circumferential face being flat, the outer diametrical side cylindrical portion being provided so as to face the inner circumferential face of the seal lip base portion in a diametrical direction,
    wherein a second labyrinth portion is formed in such a manner that an end face on the bearing space side in the outer diametrical side cylindrical portion of the first member is formed so as to face the core member circular plate portion of the second member,
    wherein a diametrical direction length of the end face is equal to or more than 0.6 mm, and
    wherein a space portion communicates with the second labyrinth portion and is formed by the outer diametrical side cylindrical portion of the first member, the circular plate portion, the lip portion slidably contacting the circular plate portion or the inner diametrical side cylindrical portion, and the seal lip base portion covering the core member circular plate portion.

2. The bearing sealing device as set forth in claim 1, wherein the diametrical direction length of the end face is equal to or more than 1.0 mm.

3. The bearing sealing device as set forth in claim 1, wherein a diametrical direction length between an inner circumferential face of the outer diametrical side cylindrical portion and a distal end portion of the lip portion before being combined with the first member is equal to or more than 1.4 mm, the distal end portion of the lip portion arranged closest to the inner circumferential face.

4. The bearing sealing device as set forth in claim 1, wherein the end face of the outer diametrical side cylindrical portion has a covering portion which is covered with elastic material, and
    wherein the covering portion comprises a plurality of concaves or convexes provided radially from a center of a shaft and apart from each other in a circumferential direction.

5. The bearing sealing device as set forth in claim 2, wherein a diametrical direction length between an inner circumferential face of the outer diametrical side cylindrical portion and a distal end portion of the lip portion before being combined with the first member is equal to or more than 1.4 mm, the distal end portion of the lip portion arranged closest to the inner circumferential face.

6. The bearing sealing device as set forth in claim 2, wherein the end face of the outer diametrical side cylindrical portion has a covering portion which is covered with elastic material, and
    wherein the covering portion comprises a plurality of concaves or convexes provided radially from a center of a shaft and apart from each other in a circumferential direction.

7. The bearing sealing device as set forth in claim 3, wherein the end face of the outer diametrical side cylindrical portion has a covering portion which is covered with elastic material, and
    wherein the covering portion comprises a plurality of concaves or convexes provided radially from a center of a shaft and apart from each other in a circumferential direction.

8. The bearing sealing device as set forth in claim 5, wherein the end face of the outer diametrical side cylindrical portion has a covering portion which is covered with elastic material, and
    wherein the covering portion comprises a plurality of concaves or convexes provided radially from a center of a shaft and apart from each other in a circumferential direction.

9. The bearing sealing device as set forth in claim 1, wherein the inner circumferential face of the seal lip base portion constituting the first labyrinth portion is configured to be inclined in such a manner that the gap gradually becomes narrow into the bearing space side along a shaft direction.

10. The bearing sealing device as set forth in claim 2, wherein the inner circumferential face of the seal lip base portion constituting the first labyrinth portion is configured to be inclined in such a manner that the gap gradually becomes narrow into the bearing space side along a shaft direction.

11. The bearing sealing device as set forth in claim 3, wherein the inner circumferential face of the seal lip base portion constituting the first labyrinth portion is configured to be inclined in such a manner that the gap gradually becomes narrow into the bearing space side along a shaft direction.

12. The bearing sealing device as set forth in claim 4, wherein the inner circumferential face of the seal lip base portion constituting the first labyrinth portion is configured to be inclined in such a manner that the gap gradually becomes narrow into the bearing space side along a shaft direction.

13. The bearing sealing device as set forth in claim 5, wherein the inner circumferential face of the seal lip base portion constituting the first labyrinth portion is configured to be inclined in such a manner that the gap gradually becomes narrow into the bearing space side along a shaft direction.

14. The bearing sealing device as set forth in claim 6, wherein the inner circumferential face of the seal lip base portion constituting the first labyrinth portion is configured to be inclined in such a manner that the gap gradually becomes narrow into the bearing space side along a shaft direction.

15. The bearing sealing device as set forth in claim 7, wherein the inner circumferential face of the seal lip base portion constituting the first labyrinth portion is configured to be inclined in such a manner that the gap gradually becomes narrow into the bearing space side along a shaft direction.

16. The bearing sealing device as set forth in claim 8, wherein the inner circumferential face of the seal lip base portion constituting the first labyrinth portion is configured to be inclined in such a manner that the gap gradually becomes narrow into the bearing space side along a shaft direction.

* * * * *